United States Patent
Sumi et al.

(10) Patent No.: US 6,663,188 B2
(45) Date of Patent: Dec. 16, 2003

(54) WHEEL COVER

(75) Inventors: Isao Sumi, Aichi (JP); Takashi Yamada, Aichi (JP); Eiji Saito, Aichi (JP); Keiichi Kitayama, Aichi (JP); Yasuhide Narita, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/193,990

(22) Filed: Jul. 15, 2002

(65) Prior Publication Data

US 2003/0015911 A1 Jan. 23, 2003

(30) Foreign Application Priority Data

Jul. 18, 2001 (JP) ........................................ 2001-218073

(51) Int. Cl.$^7$ ................................................. B60B 7/08
(52) U.S. Cl. ................... 301/37.33; 301/37.32
(58) Field of Search ...................... 301/37.101, 37.102, 301/37.31, 37.32, 37.33, 37.42, 37.43, 37.26, 37.27, 108.1, 108.3; 29/894.38, 894.381

(56) References Cited

U.S. PATENT DOCUMENTS

| | | | | | |
|---|---|---|---|---|---|
| 3,101,975 | A | * | 8/1963 | Peoples | 301/37.42 |
| 4,007,967 | A | * | 2/1977 | Buerger | 301/37.42 |
| 4,547,021 | A | * | 10/1985 | Abbate Daga | 301/37.42 |
| 4,682,820 | A | * | 7/1987 | Stalter | 301/37.42 |
| 4,790,605 | A | * | 12/1988 | Stalter | 301/37.27 |
| 4,822,109 | A | * | 4/1989 | Feria | 301/37.33 |

* cited by examiner

Primary Examiner—Russell D. Stormer
(74) Attorney, Agent, or Firm—Morgan, Lewis & Bockius LLP

(57) ABSTRACT

A cover body (22) has mounting claws (25), which are provided on a peripheral part thereof and restrained by a wire ring (23) from deforming toward the center of the cover body. The cover body is attached to a disc wheel of a vehicle by these mounting claws in such a way as to cover an outer surface part of the disc wheel. In this wheel cover, the necessity for additionally attaching the wire ring to the cover body is eliminated by inserting the wire ring thereinto and performing die-forming. Further, the stiffness of the cover body can be enhanced. Thus, a forming cycle time can be decreased. Moreover, the thickness of the cover body can be reduced.

7 Claims, 8 Drawing Sheets

WHEEL COVER

BACKGROUND OF THE INVENTION

The present invention relates to a wheel cover having a metallic wire ring provided on a synthetic resin cover body.

Hitherto, a wheel cover shown in FIG. 8 has been ordinarily used as a wheel cover for covering an outer surface part of a vehicle, for example, an automobile. That is, a cover body 2 is formed from a synthetic resin and shaped in such a manner as to have plural mounting claws 4 and plural ring supporters 5 provided on the rear surface of a main body 3 and arranged in the circumferential direction thereof so that each of the mounting claws 4 is spaced from a corresponding one of the ring supporters 5. A necessary coating is applied on a surface of this formed cover body 2. On the other hand, a wire ring 6 is formed like an endless ring by bending a metallic wire like a circle and welding both ends of the metallic wire to each other. This wire ring 6 is moved forward from the back-side of the cover body 2, as indicated by an arrow A. Then, the wire ring 5 is pushed into a mounting part 8 that is formed from the mounting claws 4 and the ring supporters 4, and that is provided on a portion located inwardly in the radial direction of the mounting claws 4 (that is, at the central side of the cover body 2).

With this configuration, in a disc wheel 9 of the automobile shown in FIG. 9, the mounting claws 4 are engaged with an annular concave portion 10a of a rim 10 by being pushed thereinto. At that time, the wire ring 6 restrains the mounting claws 4 from deforming in a direction toward the center of the cover body 2, that is, in a direction in which the mounting claws 4 are disengaged. Consequently, the mounting claws 4 are firmly engaged with the annular concave portion 10a of the rim 10. Thus, the wheel cover 1 is attached to the disc wheel 9. The cover body 2 covers an outer surface part of the disc wheel 9 by the main body 3. Incidentally, reference numeral 11 designates a tire attached to the disc wheel 9.

The conventional wheel cover 1 needs performing a step of additionally attaching the wire ring 6 to the formed and coated cover body 2. Thus, the productivity thereof is poor, so that the cost thereof becomes high.

SUMMARY OF THE INVENTION

The invention is accomplished in view of the aforementioned circumstances. Accordingly, an object of the invention is to provide a wheel cover enabled to enhance the productivity thereof, and to reduce the thickness of the cover body, and also enabled to decrease the cost thereof and to reduce the weight thereof.

To achieve the foregoing object, according to the invention, there is provided a wheel cover (hereunder referred to as a first wheel cover of the invention) that comprises a metallic wire ring, and a synthetic resin cover body that is die-formed by inserting this wire ring thereinto, that has a mounting claw provided on a peripheral part thereof and restrained by the wire ring from deforming toward the center thereof, and that is attached to a disc wheel of a vehicle by this mounting claw in such a way as to cover an outer surface part of this disc wheel.

According to the first wheel cover of the invention, the cover body is die-formed by inserting the wire ring thereinto. Thus, there is no need for additionally attaching a wire ring to the cover body.

Further, the cover body die-formed by inserting the wire ring thereinto is restrained by the wire ring from causing deformation, such as warpage, just after the die-forming thereof. Thus, there is no necessity for cooling the cover body by placing the cover body in a forming die for a long time. Consequently, the forming cycle time can be reduced.

Moreover, the stiffness of the cover body die-formed by inserting the wire ring thereinto is enhanced. Thus, the thickness of the cover body can be reduced for that.

In this case, more preferably, according to an embodiment of the first wheel cover of the invention, the wire ring is an opened wire ring. Further, the cover body has a holder formation part formed in such a manner as to have a shape adapted to enclose and hold both end parts of the wire ring by being in intimate contact therewith.

As described above, the wire ring restrains the cover body from deforming in a direction in which the mounting claw is engaged therewith and disengaged therefrom. Thus, it is necessary that the wire ring is endless and annular (incidentally, when the wire ring is opened and annular, the wire ring bends, so that the cover body cannot restrain the mounting claw thereof from deforming in the direction in which the mounting claw is engaged therewith and disengaged therefrom).

Thus, with this configuration, an opened wire ring can be changed to an endless annular one by using the holder formation part of the cover body. Thus, the mounting claw of the cover body can be reliably restrained from deforming in the direction in which the mounting claw is engaged therewith and disengaged therefrom. Additionally, this can be achieved without welding both end parts of the wire ring to each other. Furthermore, the holder formation part has a function of preventing the exposure of both end surfaces of the wire ring. Thus, both end surfaces of the wire ring are prevented from rusting. Consequently, the necessity for performing a rust prevention process on both end surfaces of the wire ring can be eliminated.

DETAILED DESCRIPTION OF PREFERRED EMBODIMENTS

Hereinafter, an embodiment of the invention is described with reference to FIGS. 1 to 4.

Figure 1:
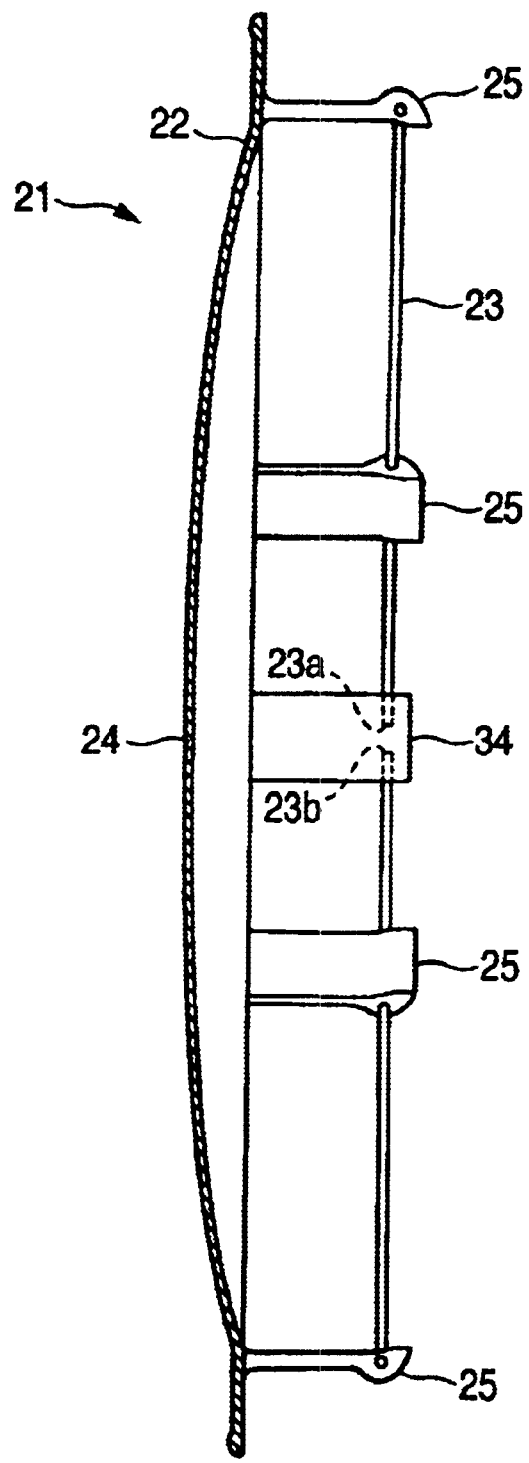
FIG. 1 is a longitudinally sectional view illustrating a single wheel cover that is a first embodiment of the invention.

Referring to FIG. 1, there is shown the entire configuration of a wheel cover 21 which comprises a cover body 22 and a wire ring 23. Between these elements, the cover body 22 is made of a synthetic resin, and includes a main body 24, which is formed like a disc swelling a little at a front side (that is, the left side, as viewed in FIG. 1) thereof, and a plurality of mounting claws 25 provided on a peripheral part of the rear surface of this main body 24 in such a way as to project therefrom. On the other hand, the wire ring 23 is made of a metal. Especially, in this case, the wire ring 23 is formed like an opened ring (that is, C-shaped) by bending a metallic wire. The wire ring 23 is provided in such a manner as to uniformly penetrate through the mounting claws 25 of the cover body 22 and as to be integral with the cover body 22.

Figure 2:
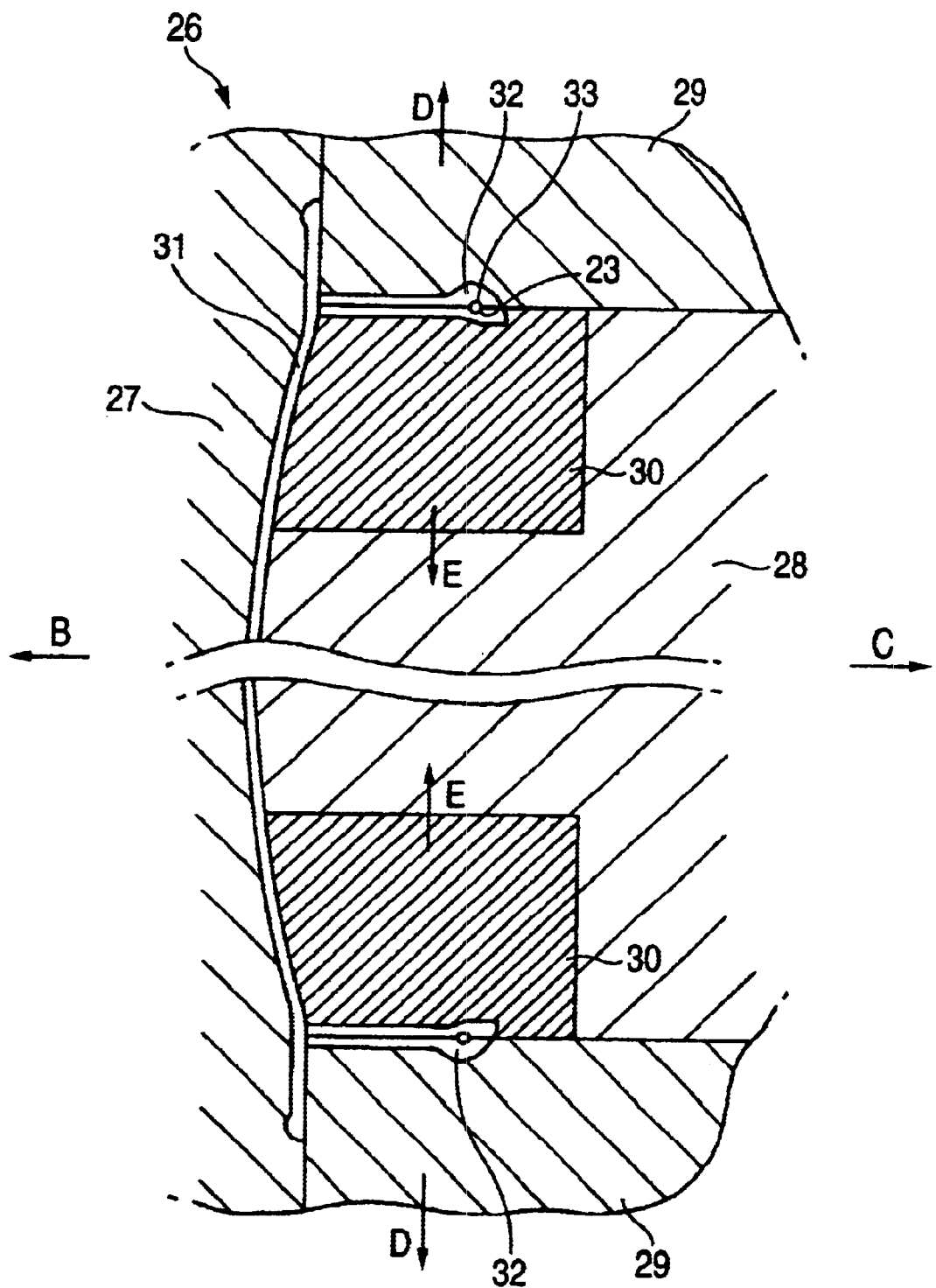
FIG. 2 is a longitudinally sectional view illustrating a die system for forming the wheel cover.

Referring next to FIG. 2, there is shown a die apparatus 26 for forming the cover body 22 which is constituted by a single die 27 to be slid from the position, in which the cover body 2 is in the die-assembled condition, in the direction of an arrow B which is the frontward direction of the cover body 22, a single die 28 to be slid in the direction of an arrow C which is the backward direction of the cover body 22, a plurality of dies 29 to be slid in the direction of an arrow D which is the centrifugal direction of the cover body 22, and a plurality of dies 30 to be slid in the direction of an arrow, which is the centripetal direction of the cover body 22.

This die apparatus 26 has a cavity 31 for forming the main body 24 of the cover body 22 among the dies 27, 28, 29, and 30, and a cavity 32 for forming the mounting claws 25 between the dies 29 and 30. The die apparatus 26 has hole portions, into each of which the wire ring is inserted, for holding the wire ring which are provided between the dies 29 and 30 and between the dies 29 and 28, respectively (incidentally, this figure shows only the hole portion provided between the dies 29 and 30). During a state in which the wire ring 23 is inserted into and held by the hold portions, a molten material resin is injection-poured into the cavities 31 and 32.

Thus, the cover body 22 is die-formed by inserting the wire ring 23 thereinto. When the material resin is hardened, first, the dies 27 and 28 are slid in the directions of the arrows B and C, respectively. Thereafter, the dies 29 and 30 are slid in the directions of the arrows D and E, respectively. Thus, the formed cover body 22 is taken out of the die apparatus 22. This taken out cover body 22 is formed as illustrated in FIG. 1.

Figure 3:
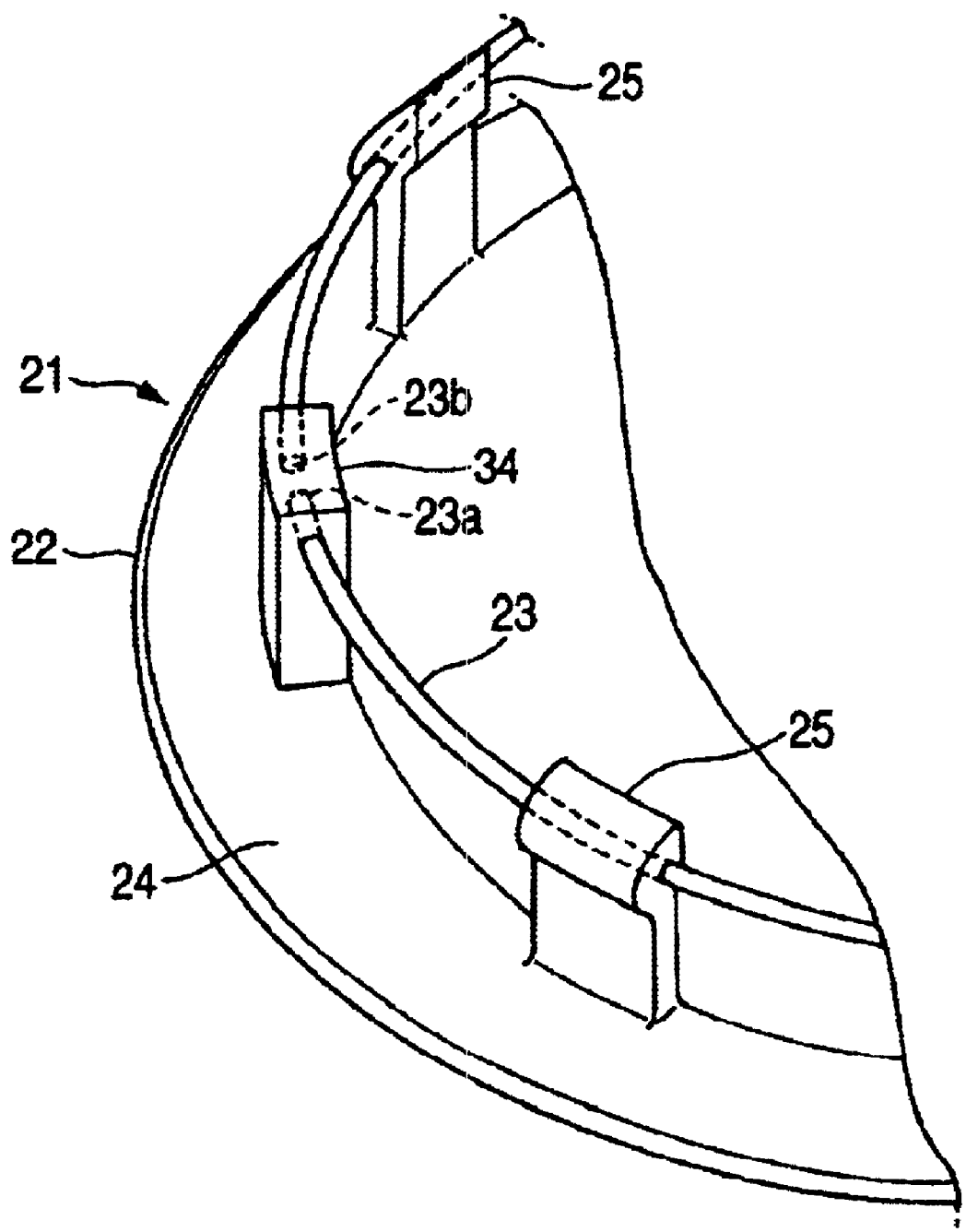
FIG. 3 is a partially perspective view illustrating the wheel cover.

FIG. 3 shows a single holder formation part 34 provided on the rear surface of the main body 24 of the over body 22. This holder formation part 34 is formed by injection-pouring a molten material resin into the cavity (not shown) provided between the dies 29 and 30 of the die apparatus 26. Both end parts 23a and 23b of the opened annular wire ring 23 are placed in the cavity (not shown). Thus, the formed holder formation part 34 comes into intimate contact with and enclose and holds both end parts 23a and 23b of the wire ring 23.

Figure 4:
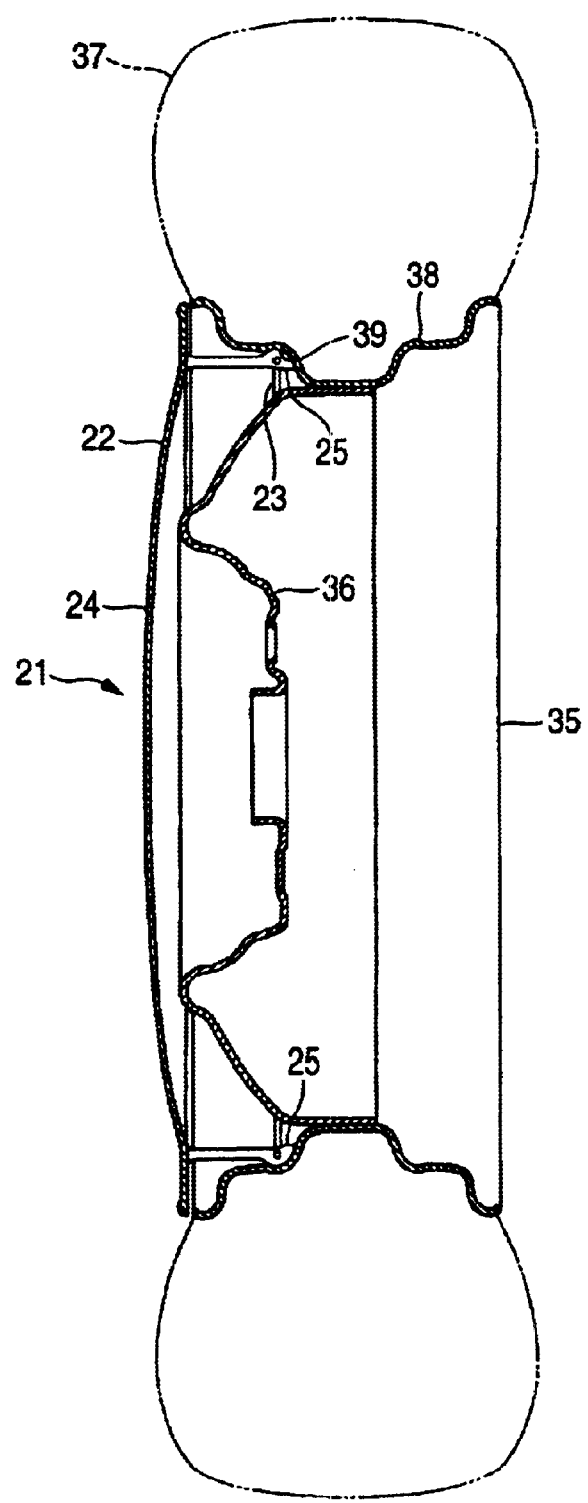
FIG. 4 is a longitudinally sectional view illustrating the wheel cover and the disc wheel, to which the wheel cover is attached.

FIG. 4 illustrates a state in which the aforementioned wheel cover 2 is attached to the disc wheel 35 of the vehicle, for example, an automobile. In this case, the disc wheel 35 has a configuration in which a disc 36 to be attached to a hub (not shown) of the automobile is provided in such a way as to be integral with the rim 38 for attaching the tire 37. The rim 38 has an annular concave part 39 provided in an inner surface part at a side opposite to the side, to which the tire 37 is attached.

The main body 24 of the wheel cover 21 faces the outer surface part of the disc wheel 35, and the mounting claws 25 is pushed into the annular concave part 39 of the rim 38 to thereby engage the mounting claws 25 therewith. At that time, the wire ring 23 restrains the mounting claws 25 from deforming toward the center of the cover body 25, that is, in the direction in which each of the mounting claws 25 is engaged therewith or disengaged therefrom. Thus, the mounting claws 25 rigidly engage with the annular concave part 39 of the rim 38 and the wheel cover 212 is attached to the disc wheel 35. The outer surface part of the disc wheel 35 is covered by the main body 24 of the cover body 21.

Thus, in the case of the wheel cover 21 of this configuration, the cover body 22 is die-formed by inserting the wire ring 23 thereinto. Therefore, there is no need for additionally attaching the wire ring 23 to the cover body 22, differently from the conventional wheel cover, in which the wire ring is attached to the cover body. Consequently, according to the invention, the step of attaching the wire ring 23 to the cover body 22 can be omitted. Thus, the productivity thereof can be enhanced.

In the case of the cover body 22 die-formed by inserting the wire ring 23 thereinto, deformation, such as warpage, is restrained by the wire ring 23 from occurring just after the die-forming. Thus, there is no necessity for cooling the cover body 22 by placing the cover body 22 in the forming die (that is, the die apparatus 26) for a long time so as to prevent an occurrence of such deformation. Therefore, the cover body 22 can be taken out of the die apparatus within a little short time since the completion of the die-forming. Consequently, a forming cycle time can be decreased. Thus, the productivity of the wheel cover can be enhanced still more.

The stiffness of the cover body 22 die-formed by inserting the wire ring 23 thereinto is enhanced by the wire ring 23. Thus, the thickness of the main body 24 of the cover body 22 can be reduced. Therefore, in addition to the improvement of the productivity thereof, the cost thereof can be sufficiently reduced. Moreover, the weight of the wheel cover can be decreased. Further, the adoption of the die-forming of the cover body 22 by inserting the wire ring 23 thereinto enables the wheel cover 21 to more reliably restrain the mounting claws 25 from deforming in the direction in which each of the mounting claws 25 is engaged therewith or disengaged therefrom. Thus, the wheel cover 21 can be firmly attached to the disc wheel 35 still more for that.

In the case of the wheel cover of the aforementioned configuration, the wire ring 23 is opened. The cover body 22 has the holder formation part 34, which is die-formed in such a way as to come into intimate contact with and enclose and hold both end parts 23a and 23b of the wire ring 23.

As described above, the wire ring 23 restrains the mounting claws 25 from deforming in the direction, in which each of the mounting claws 25 is engaged therewith or disengaged therefrom. Thus, it is necessary that the ring wire 23 is endless and annular (incidentally, when the wire ring 23 is shaped like an opened ring, the wire ring 23 bends, so that the cover body 22 cannot restrain each of the mounting claws thereof from deforming in the direction in which the mounting claw is engaged therewith and disengaged therefrom).

On the other hand, with the aforementioned configuration, the shape of the opened wire ring 23 can be changed by the holder formation part 34 to an endless annular one. Thus, the wheel cover 21 can more reliably restraining the mounting claws 25 from deforming in the direction in which the mounting claw is engaged therewith and disengaged therefrom. Moreover, this is achieved without welding both end parts 23a and 23b of the wire ring 23 to each other, differently from the conventional case in which both end parts thereof are welded to each other. Therefore, according to the invention, the step of welding both end parts 23a and 23b of the wire ring 23 to each other can be omitted. Thus, the productivity thereof can be enhanced still more. Additionally, the cost thereof can be reduced still more.

Moreover, in this case, exposure of both end surfaces of the wire ring 23 can be prevented by the holder formation part 34. Thus, both end surfaces of the wire ring 23 can be prevented from rusting. Consequently, the necessity for additionally performing a rust prevention process on both end surfaces of the wire ring can be eliminated. Incidentally, the need for additionally performing a rust prevention process on the exposed parts other than both end parts 23a and 23b enclosed and held by the holder formation part 34 and the parts placed in the mounting claws 25 can be eliminated by die-forming the cover body 22 in such a way as to coat the exposed parts with the material resin of the cover body 22.

Figure 5:
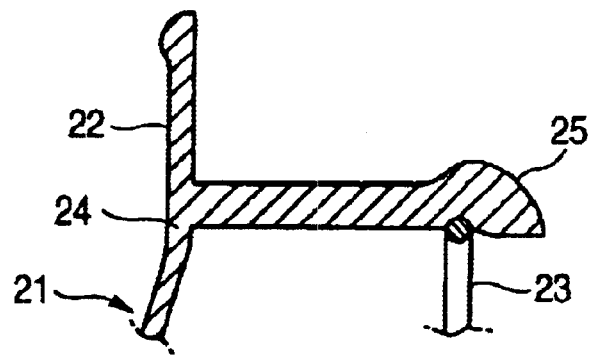
FIG. 5 is a partially enlarged longitudinally sectional view illustrating a wheel cover that is another embodiment of the invention.

FIG. 5 illustrates another embodiment of the invention. The wire ring 23 is placed so that a part, for example, a half of the wire ring 23 is exposed from the mounting claws 25. The cover body 22 may be die-formed by inserting the wire ring 23 thereinto in such a manner.

Figure 6:
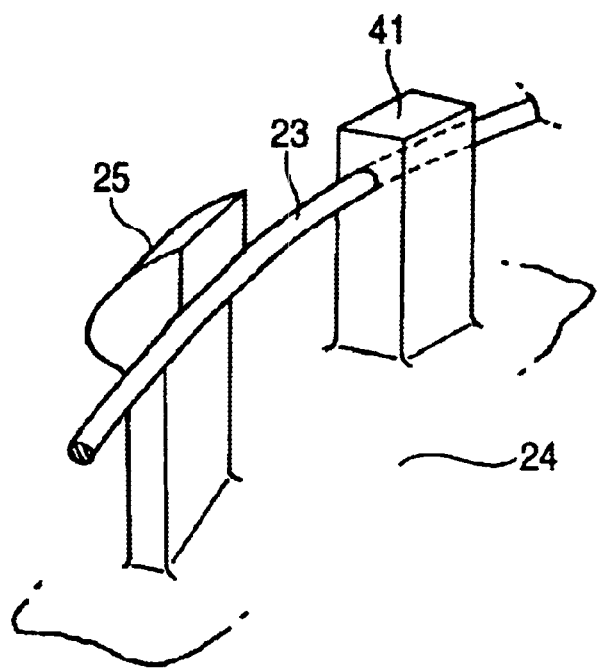
FIG. 6 is a partially enlarged longitudinally sectional view illustrating a wheel cover that is still another embodiment of the invention.

FIG. 6 illustrates still another embodiment of the invention. This embodiment is adapted so that the wire ring 23 is held by a holding part 41 formed in the cover body 22 other than the mounting claws 25 (incidentally, the wire ring 23 is merely placed inwardly from the mounting claws 25). The cover body 22 may be die-formed by inserting the wire ring 23 in such a manner.

Figure 7:
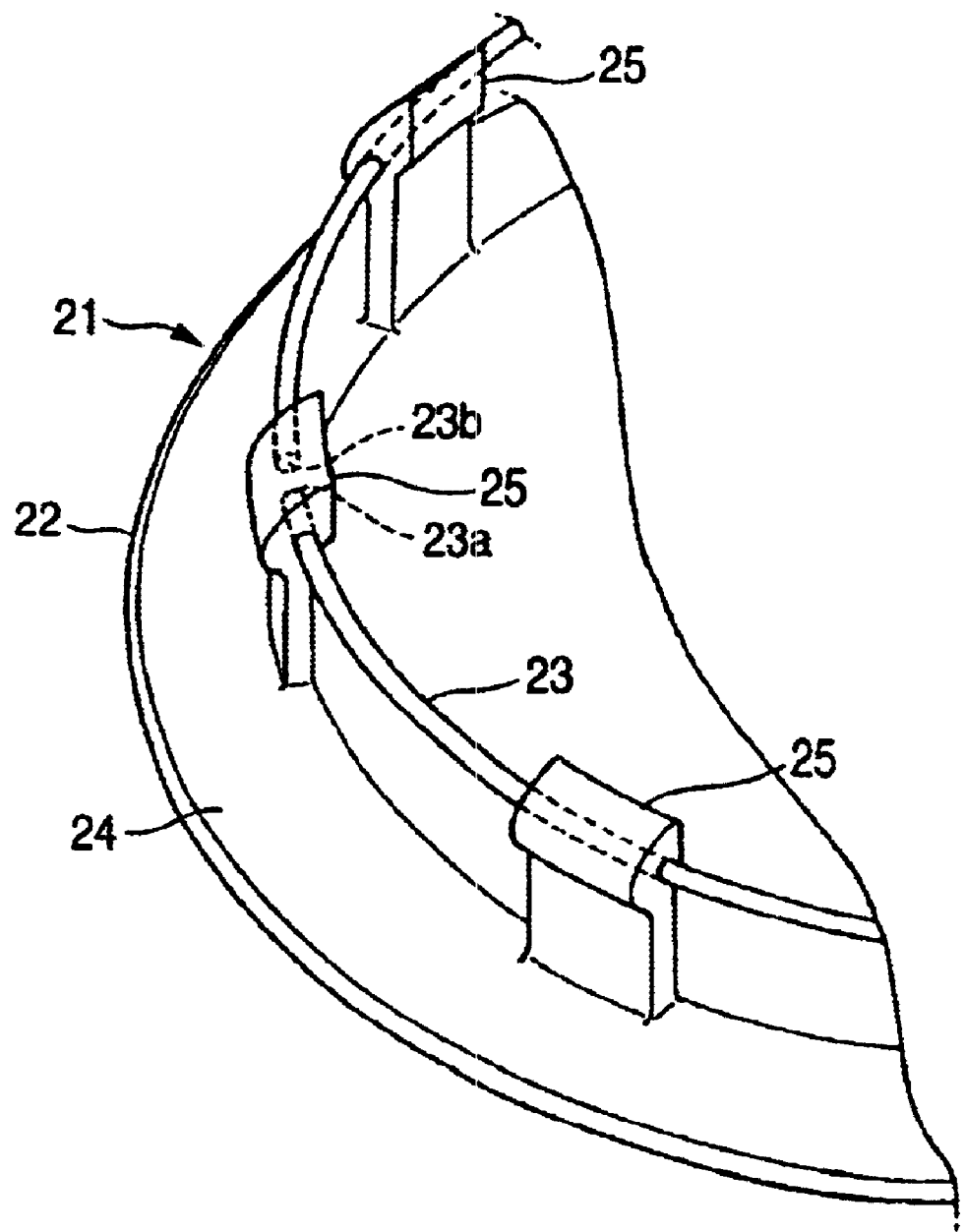
FIG. 7 is a view illustrating another holder formation part and corresponding to FIG. 3.
Figure 8:
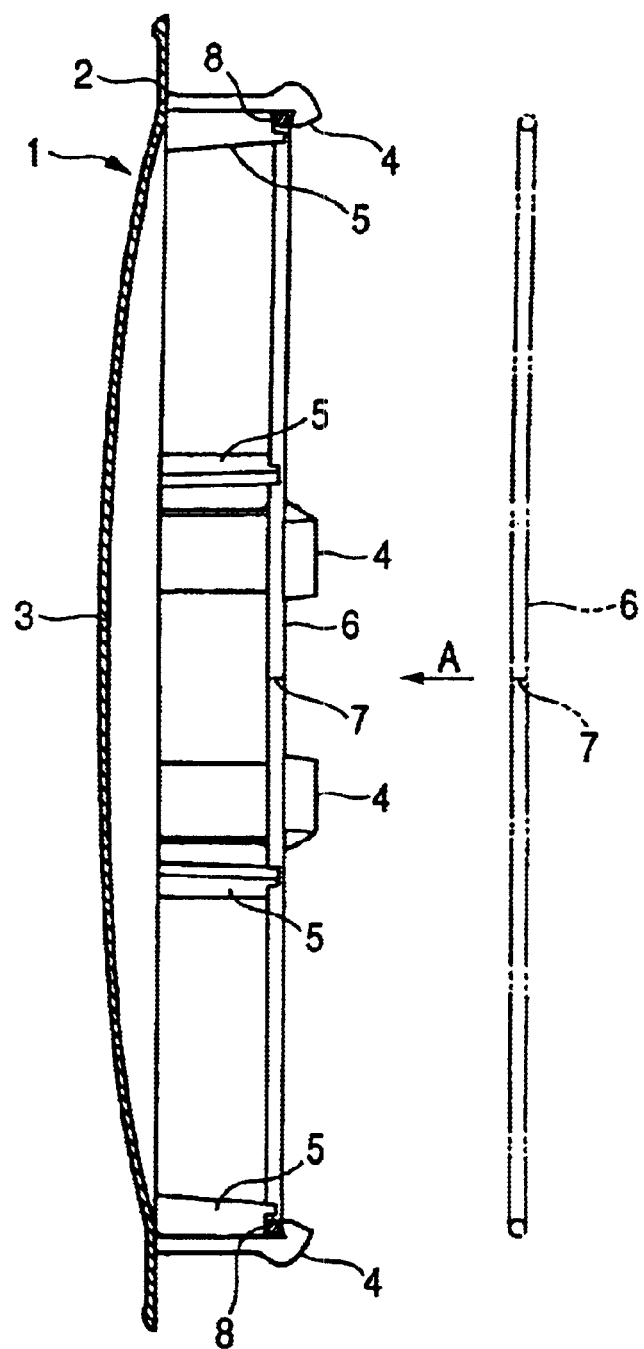
FIG. 8 is a view illustrating a conventional wheel cover and corresponding to FIG. 1.
Figure 9:
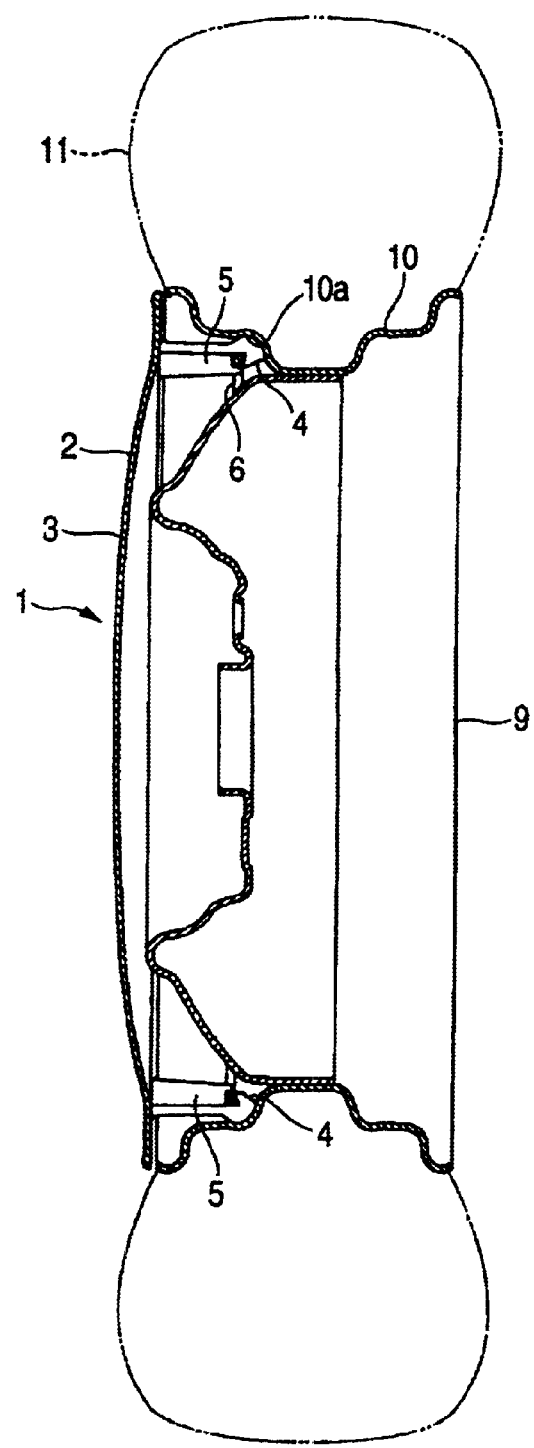
FIG. 9 is a longitudinally sectional view illustrating the conventional wheel cover and the disc wheel to which the wheel cover is attached and corresponding to FIG. 4.

As illustrated in FIG. 7, the wheel cover may be adapted so that one of the mounting claws 25 also serves as the holder formation part, which comes into intimate contact with and hold both end parts 23a and 23b.

There is no need for necessarily bending the wire ring 23 like a ring before inserted into the die apparatus 26. Even when a metallic wire is, for example, straight, the wire ring can be maintained in a ring shape by bending the metallic wire, whose temperature is raised to a value at which permanent deformation occurs, and simultaneously inserting such a metallic wire into the die apparatus 26.

The die-forming can be performed with little time loss by setting, when the formed cover body 22 is taken out of the die apparatus 26, a wire ring 23 to be used at the next die-forming is simultaneously set in the die apparatus. Consequently, the productivity of the wheel cover can be enhanced still more.

As described above, according to the wheel cover of the invention, the productivity thereof can be enhanced. Moreover, the thickness of the cover body can be decreased. Thus, the cost of the wheel cover can be reduced. Furthermore, the weight of the wheel cover can be decreased. Additionally, the attachment of the wheel cover to the disc wheel can be firmly performed.

What is claimed is:

1. A wheel cover comprising:

a metallic wire ring; and a synthetic resin cover body which is die-formed by inserting the wire ring thereinto, the resin cover restrained by the wire ring, and the resin cover includes a mounting claw provided on a peripheral part thereof and restrained by the wire ring from deforming toward a center thereof, the mounting claw being attached to a disc wheel of a vehicle so that the resin cover covers an outer surface of the disc wheel.

2. The wheel cover according to claim 1, wherein the wire ring is an open wire ring, and the cover body includes a holder formation part formed so as to have a shape adapted to enclose and hold end parts of the wire ring by being in intimate contact therewith.

3. The wheel cover according to claim 1, wherein the mounting claw is die-formed by inserting the wire ring thereinto.

4. The wheel cover according to claim 3, wherein the wire ring is an open wire ring, and the mounting claw encloses and holds end parts of the wire ring by being in intimate contact therewith.

5. The wheel cover according to claim 1, wherein a plurality of the mounting claws are provided on the peripheral part of the resin cover.

6. The wheel cover according to claim 5, wherein each of the plurality of the mounting claws encloses and holds end parts of the wire ring by being in intimate contact therewith.

7. The wheel cover according to claim 1, wherein the synthetic resin cover body and the wire ring are concentric.

\* \* \* \* \*